(12) United States Patent
Franck et al.

(10) Patent No.: US 6,188,497 B1
(45) Date of Patent: Feb. 13, 2001

(54) DUO-BINARY SIGNAL ENCODING

(75) Inventors: Thorkild Franck, Rumson; Per Bang Hansen, Bradley Beach, both of NJ (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/321,347

(22) Filed: May 27, 1999

Related U.S. Application Data

(63) Continuation of application No. 08/799,987, filed on Feb. 13, 1997, now Pat. No. 5,917,638.

(51) Int. Cl.[7] .................................................. H04B 10/04
(52) U.S. Cl. ..................... 359/181; 359/140; 359/180; 359/345; 250/227.12
(58) Field of Search ..................................... 359/181, 180, 359/140; 356/345; 375/286, 291; 250/227.12

(56) References Cited

U.S. PATENT DOCUMENTS

| | | | |
|---|---|---|---|
| 5,353,114 | 10/1994 | Hansen | 356/345 |
| 5,543,952 | * 8/1996 | Yonenaga et al. | 359/181 |
| 5,625,722 | * 4/1997 | Froberg et al. | 385/1 |
| 5,917,179 | * 5/1999 | Yao | 250/227.11 |
| 5,917,638 | * 6/1999 | Franck et al. | 359/181 |

* cited by examiner

*Primary Examiner*—Kinfe-Michael Negash
(74) *Attorney, Agent, or Firm*—G. C. Ranieri

(57) ABSTRACT

Apparatus for implementing the application of duo-binary signal encoding in high-power, high-speed transmission systems which may be employed to mitigate the problem of stimulated Brillouin scattering. A dual-drive Mach-Zehnder interferometer modulator is used, with data being applied to both modulation inputs. The voltage difference between the two modulation inputs is between $-V_\pi$ and $+V_\pi$. In one embodiment, the data signal is applied to one input, and the same signal, delayed by one bit, is applied to the second input, and the modulator is biased so as to have minimum throughput when both inputs are identical. In the second embodiment, the data signal is applied to one input and the complementary data-bar signal, delayed one bit, is applied to the second input, with the modulator biased to minimum throughput when both inputs are identical. This novel implementation has been verified experimentally showing a power penalty of less than 1 dB relative to a conventional binary signal. No inherent penalty is expected. Likewise it is demonstrated that significant increases of the SBS will increase the bit rate of duo-binary encoded signals. For example, the SBS threshold at 10 Gb/s is 12.7 dB higher for duo-binary encoding than for conventional binary modulation.

10 Claims, 6 Drawing Sheets

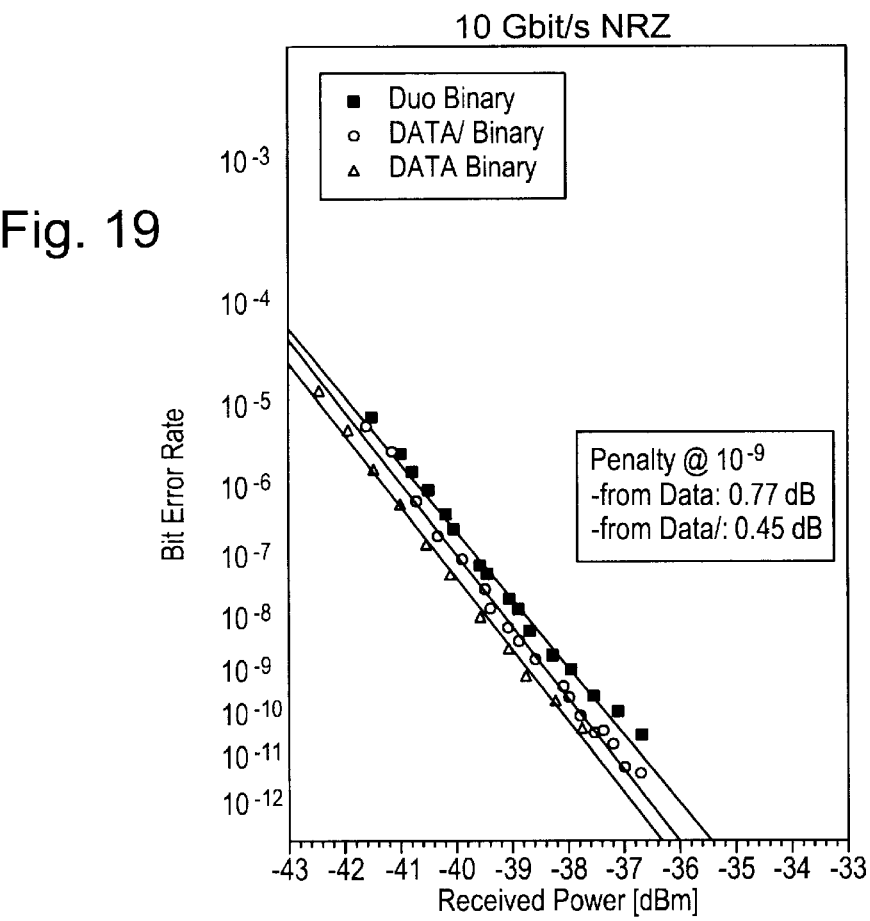
Fig. 19
Fig. 20　　　　　　　　Fig. 22
*Eye diagrams for 10 Gbit/s NRZ Binary and Duo Binary PRBS $2^{11}$-1*
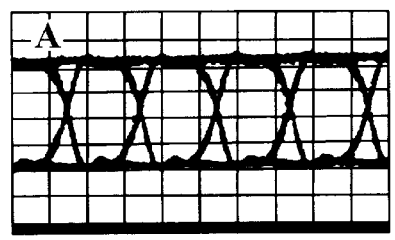
Transmitted binary eye (optical)
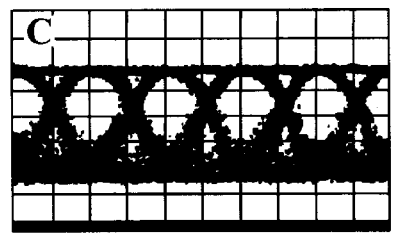
Received Binary eye @ BER $10^7$ (electrical)
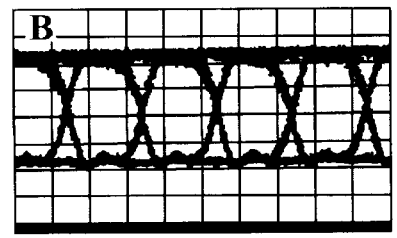
Transmitted Duo Binary eye (optical)
Fig. 21
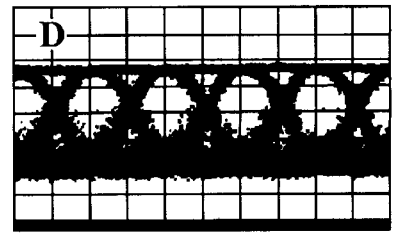
Received Duo Binary eye @ BER $10^{-9}$ (electrical)
Fig. 23

DUO-BINARY SIGNAL ENCODING

This application is a continuation of U.S. patent application Ser. No. 08/799,887 now filed Feb. 13, 1997 now U.S. Pat. No. 5,917,638.

FIELD OF THE INVENTION

The invention pertains to the field of apparatus for modulation of optical signals. More particularly, the invention pertains to apparatus for multi-level encoding of data in optical communications systems.

BACKGROUND OF THE INVENTION

A Mach-Zender interferometer modulator splits an incoming beam in two, and the two halves of the beam travel along separate paths or "branches", then being mixed together and interfering with each other. The optical delay of the branches can be controlled by the inputs of the M-Z modulator, and the two branches can be biased so that the two halves cancel completely in the absence of modulation.

In the type of M-Z modulator used in the present invention, there are usually two high-speed modulation inputs, one for each branch, and one or two low-speed bias input(s). This type of modulator is generally termed a "dual-drive modulator", as is shown in FIG. 1. The two drive signals applied to the two branches are termed "$V_1(t)$" (1) and "$V_2(t)$" (4). The bias voltage, termed "$V_{bias}$", may either be applied to the one or two low-speed bias inputs (5), as shown in FIG. 1, or $V_{bias}$ may be applied to the high-speed modulation inputs along with $V_1(t)$ and $V_2(t)$ using a "bias-T" as was done in U.S. Pat. No. 5,353,114, issued to one of the present inventors for "Opto-Electronic Interferometric Logic". It will be understood that where the term "bias" is used in this specification, that this is intended to encompass either means of applying the $V_{bias}$.

When the signal is applied to a M-Z modulator, the bias level is adjusted to produce destructive interference, and thus minimum throughput, when the drive voltages on the two modulation ($V_1 = V_2$).

Duo binary modulation formats as described here employ two levels for representing a boolean "one", and one level for representing a boolean "zero". As shown in FIG. 2, the two "one" levels in the electrical domain are typically separated by $2V_\pi$ and the "zero" level is the average voltage of the two "ones", assuming a Mach-Zehnder modulator with a constant $V_\pi$. Here V, the abscissa of FIG. 2, is the difference in voltage applied to a dual-drive modulator.

Typical characteristics for duo binary encoding include that it contains no carriers and that the first zero of the baseband spectrum is located at a frequency equal to half the bit rate. The narrow spectral width compared to a conventional NRZ binary signal have been exploited in attempts to minimize sensitivity to dispersion and to enable very high-density wavelength division multiplexing. Furthermore, it has been suggested that its special characteristics will increase the SBS threshold.

Conventional implementations of duo-binary modulation have relied on generating a three level signal electrically either by loss-pass filtering or by three level digital circuitry. Low-pass filtering in particular typically results in poor eye quality current, which leads to significant power penalties.

Optical duo binary signals are typically implemented according to the principle shown in FIGS. 1 to 4. As seen in FIG. 1, the incoming data signal $V_1(t)$ (1) is fed to one input of an optical modulator, typically one arm of a Mach-Zehnder interferometer (2), and the complementary signal Data-bar, $V_2(t)$ (=−V1(t)) (4) is fed to the second input, modulating the optical input (6) and resulting a modulated optical signal P(t) (3).

As a matter of terminology, the term "Data" will be used herein to mean the data input signal. The term "Data-bar" will be understood to mean the complementary signal to "Data"—that is, when the state of Data is "one", the state of Data-bar is "zero", and when Data is "zero", Data-bar is "one".

FIGS. 5 and 8 show the schematic of two typical prior-art implementations with driver-amplifiers with a voltage-swing from $-V_\pi/2$ to $+V_\pi/2$. The signals $V_1(t)$ and $V_2(t)$ may take on values of $-V_\pi/2$, 0 or $+V_\pi/2$.

The "ones", being neighboring local maxima of the modulator voltage-to-optical transfer curve (see FIG. 2), will have opposite phase for the transmitted optical signal. Optical "ones" here will be denoted "0" and "π" to indicate the two possible states of the phase. This, however does not indicate the absolute value or the evolution of the phase during a "one".

In FIG. 5 a low-pass filter (51) with a bandwidth of approximately ¼ to ⅓ of the bit rate is placed in the Data stream (50) before the data amplifier (52), the output of which, $V_1(t)$ (53) is applied to one branch of the modulator (55). A similar low-pass filter (64) is placed in the Data-bar stream (61) before its data amplifier (62), whose output $V_2(t)$ (63) is applied to the other branch of modulator (55). The bias voltage $V_{bias}$ (56) of the modulator (55) is set so that $V_1 = V_2$ results in minimum throughput. Carefully following the evolution of a bit stream will convince one that a duobinary differential encoding is obtained with a characteristic electrical and optical eye pattern as shown in FIGS. 6 and 7, respectively, when we assume a square-law detector.

FIG. 8 shows an implementation where the three levels are obtained by high-speed logic gates (i.e. adders (82) and (85)). The Data input (50) is fed to one input of the adder (82), and also to a one-bit delay (81). The delayed Data signal becomes the second input to adder (82). The output of the adder (82) is amplified (52) and, as $V_1(t)$ becomes the modulation input (53) to the first input of the modulator (55). The complementary Data-bar input (86) is fed to one input of the adder (85), and also to a one-bit delay (87). The delayed data-bar signal becomes the second input to adder (85). The output of the adder (85) is amplified (82) and, as $V_2(t)$ becomes the modulation input (83) to the second input of the modulator (55). Again, as in FIG. 5, the modulator (55) is biased (56) to produce minimum throughput when $V_1 = V_2$ is applied. The optical signal input (54) is modulated in the modulator (55) and the modulated output (57) is denoted P(t). The encoding is again differential. The optical eye-pattern observed with a square-law detector is in principle indistinguishable from a conventional NRZ binary modulation format. FIG. 9 shows graphs of the DATA (90), V(t) (91) ($V(t)=V_1(t)-V_2(t)$) and P(t) functions for the circuit of FIG. 8.

Notice that the differential encoding which may be unwanted can be compensated by using a differential encoder (electrical) between the data source and these circuits.

The method of FIG. 8 can be modified to provide a different distribution of the phases by adopting the diagram of FIG. 10. Here Data-bar (86), delayed one bit period in time delay (81), is added in adder (82) to DATA (50). The result is amplified (52), and becomes the modulating input $V_1(t)$ (53) to the modulator (55). Similarly, DATA (50), delayed one bit in time delay (87) is added in adder (85) to Data-bar (86), amplified in amplifier (84), and becomes the second input $V_2(t)$ (83). As in FIG. 8, the optical input (54) is modulated in modulator (55) and the modulated output (57) is denoted P(t). Again the bias (56) is set to produce minimum throughput for $V_1 = V_2$. FIG. 11 shows graphs of DATA (90), V(t) (V(t)=$V_1(t)-V_2(t)$) (91) and P(t) (92) for the circuit of FIG. 10.

SUMMARY OF THE INVENTION

The invention presents an apparatus for implementing the application of duo-binary signal encoding in high-power, high-speed transmission systems. In such systems it may be applied to mitigate the problem of stimulated Brillouin scattering (SBS). A dual-drive Mach-Zehnder interferometer modulator is used, with data being applied to both electrical signal inputs. In one embodiment, the data signal is applied to one input, and the same signal, delayed by one bit, is applied to the second input, and the modulator is biased so as to have minimum throughput when the inputs are equal. In the second embodiment, the data signal is applied to one input and the complementary data-bar signal, delayed one bit, is applied to the second input, with the modulator biased to minimum throughput when the inputs are equal. This novel implementation has been verified experimentally showing a power penalty of less than 1 dB relative to a conventional binary signal. No inherent penalty is expected. Likewise it is demonstrated that significant increases of the SBS will increase the bit rate of duo-binary encoded signals. For example, the SBS threshold at 10 Gb/s is 12.7 dB higher for duo-binary encoding than for conventional binary modulation.

BRIEF DESCRIPTION OF THE DRAWING

FIG. 19 shows a graph of measured bit error rates versus received power for binary using the DATA output and one driver amp, binary using the $\overline{DATA}$ output and the second driver amp, and for duo-binary encoding for the test of the circuit of FIG. 16.

FIG. 20 shows the transmitted optical eye diagram for binary coding in the test of FIG. 16.

FIG. 21 shows the transmitted optical eye diagram for duo-binary coding in the FIG. 16 test.

FIG. 22 shows the received electrical eye diagram for binary coding in the test of FIG. 16.

FIG. 23 shows the received electrical eye diagram for duo-binary coding in the FIG. 16 test.

DESCRIPTION OF THE PREFERRED EMBODIMENT

Figure 1:
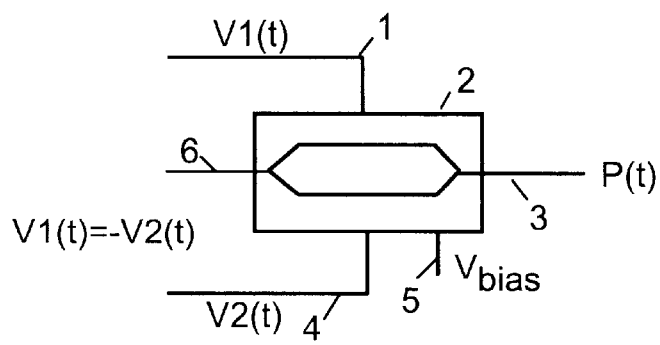
FIG. 1 shows a block diagram of a dual drive modulator.
Figure 2:
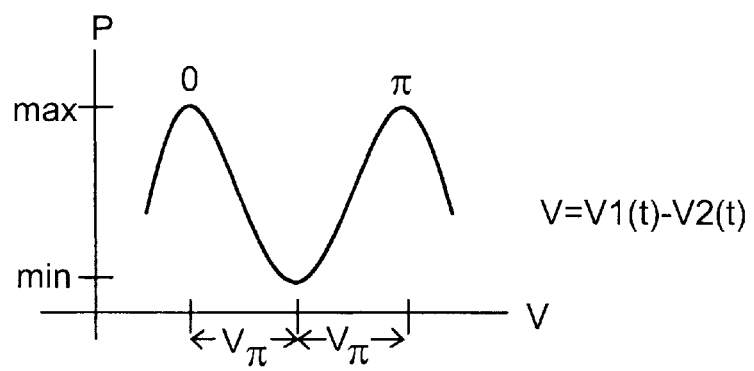
FIG. 2 shows a graph of the output P(t) vs. the input V(t) (V(t)=$V_1(t)-V_2(t)$) for the modulator of FIG. 1.
Figure 3:
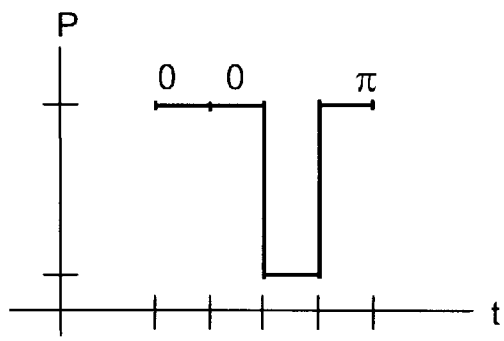
FIG. 3 shows a graph of the output P(t) of the modulator of FIG. 1 as a function of time.
Figure 4:
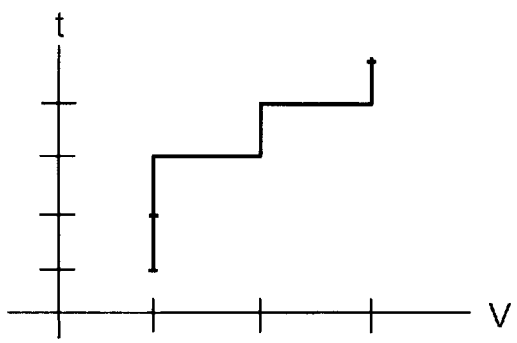
FIG. 4 shows a graph of the input V(t) of the modulator of FIG. 1 as a function of time.
Figure 5:
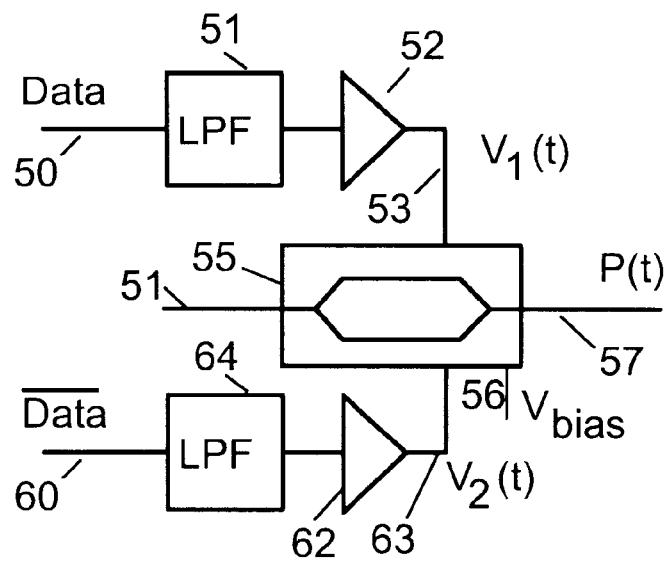
FIG. 5 shows a block diagram of the prior art method of duo-binary encoding by low-pass filtering.
Figure 6:
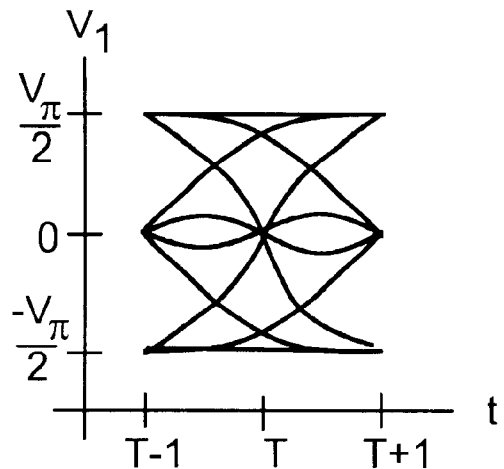
FIG. 6 shows a graph of the input $V_1(t)$ to the modulator of FIG. 5, showing the electrical "eye" pattern.
Figure 7:
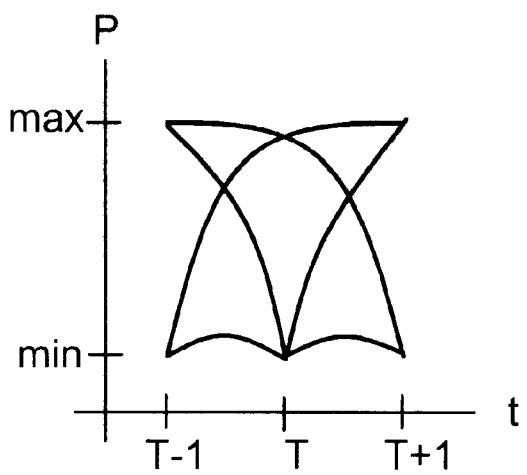
FIG. 7 shows a graph of the output P(t) of the modulator of FIG. 5, showing the optical "eye" pattern.
Figure 8:
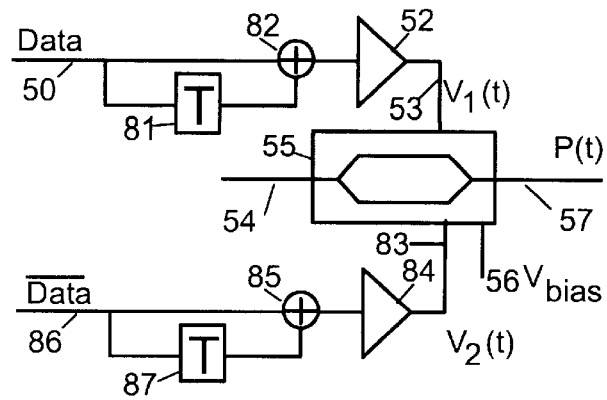
FIG. 8 shows a block diagram of the prior art duo-binary implementation with logic gates.
Figure 9:
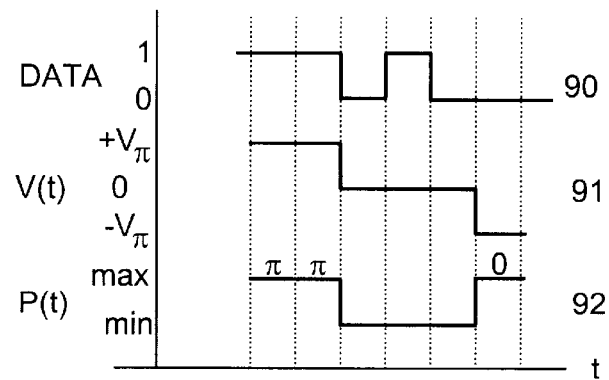
FIG. 9 shows a graph of data input, voltage difference (V(t)=$V_1(t)-V_2(t)$), and optical output for the circuit of FIG. 8.
Figure 10:
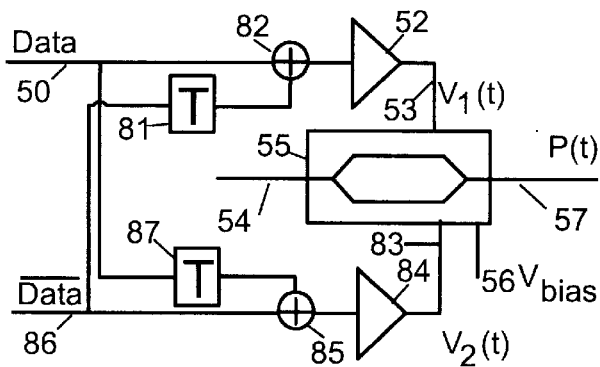
FIG. 10 shows a block diagram of the circuit of FIG. 8, with the addition of the use of the $\overline{DATA}$ function, delayed one bit, and then added to the DATA signal.
Figure 11:
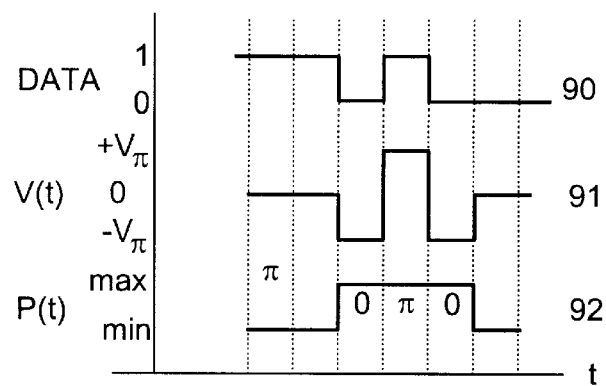
FIG. 11 shows a graph of data input, voltage difference input (V(t)=$V_1(t)-V_2(t)$), and optical output for the circuit of FIG. 10.

The novel implementation described here in effect performs the logic adding of the methods described in FIGS. 8 and 10 in the M-Z modulator by employing a modulator with a separate electrode for each of the two branches, without the use of adders.

Figure 12:
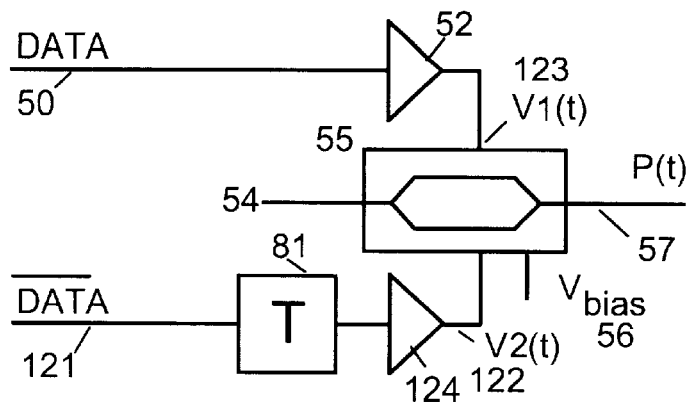
FIG. 12 shows a block diagram of a first embodiment of the invention.

FIG. 12 shows a first embodiment of the invention. The DATA input (50) is amplified in amplifier (52) and, as $V_1(t)$, is fed to one input of a Mach-Zehnder modulator (55). The DATA-bar ($\overline{DATA}$) input (121) is delayed in a one bit delay (81), amplified (124) and fed as $V_2(t)$ to the second input (122) of the modulator (55). The optical signal input (54) is modulated in modulator (55) by $V_1(t)$ (123) and $V_2(t)$ (122) and the modulated output (57) of the modulator (55) is denoted P(t). The bias input (56) is set so as to result in minimum throughput when $V_1 = V_2$.

Figure 13:
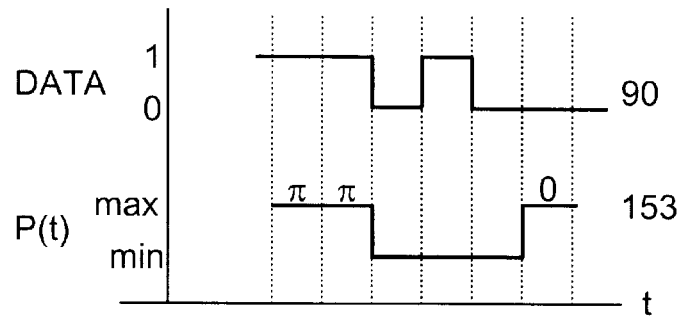
FIG. 13 shows a graph of data input and output for the circuit of FIG. 12.

FIG. 13 shows a graph of DATA (90) and P(t)(131) for the apparatus of FIG. 12.

Figure 14:
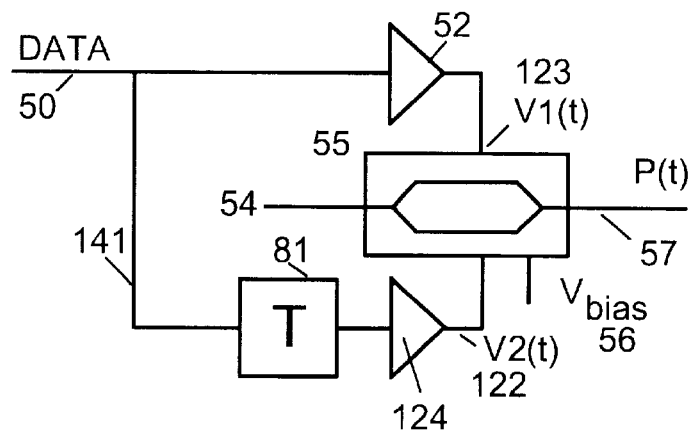
FIG. 14 shows a block diagram of a second embodiment of the invention.

An alternate embodiment of the invention is given as FIG. 14. In this implementation, the DATA signal (50) is the input to the $V_1(t)$(123) amplifier (52) and is also the input (141) to the one-bit delay (81) of $V_2(t)$(122). The bias input (56) is set so as to result in minimum throughput when $V_1 = V_2$. The rest of the circuit is the same as explained above for FIG. 12.

As noted in the background, above, where the term "bias input" is used here, it includes biasing the modulator either through a separate low-speed bias input or through the use of a bias-T which introduces the bias voltage at the high-speed modulation input with the $V_1$ and/or $V_2$ signals.

Figure 15:
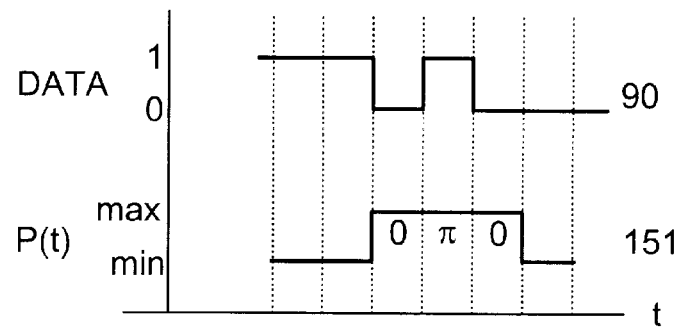
FIG. 15 shows a graph of data input and output for the circuit of FIG. 14.

FIG. 15 shows a graph of DATA (90) and P(t)(151) for the apparatus of FIG. 14. As can be seen, the output P(t) (151) of the circuit of FIG. 14 is the inverse of the output P(t)(131) of the circuit of FIG. 12 as seen in FIG. 13.

Because the electrical signals $V_1(t)$ and $V_2(t)$ in FIGS. 12 and 14 are only two-level signals, although the resulting optical signal P(t) is duobinary, the requirements on the RF driver-amplifiers are relaxed and the transmitters are expected to exhibit less pattern dependence.

Examples corresponding to FIG. 8 and FIG. 12 of the operations involved in creating a duo-binary signal from a data signal are shown in table 1 below. The function Diff (data) is defined as:

$$\text{Diff }(\text{Data}_k) = \text{Diff }(\text{Data}_{k-1}) \oplus \text{Data}_k$$

where the symbol $\oplus$ means "exclusive or" (abbreviated XOR).

Explanation of Table 1

The first column (Data) is data that we want to encode. First it is inverted to Inv(data) (column 2) then a differential encoding is done-electrical-to-electrical (column 3) that is delivered to the circuits as DATA. A three level format is constructed corresponding to column 4. Finally the two last columns (5 and 6) show the optical bits and the associated phase for "ones".

TABLE 1

Data Plus Data-bar Delayed

| Data | Data-bar | Diff(Data) | 3-Level | Optical | Phase |
|---|---|---|---|---|---|
| 1 | 0 | 1 | na | na | na |
| 1 | 0 | 1 | 2 | 1 | π |
| 1 | 0 | 1 | 2 | 1 | π |
| 0 | 1 | 0 | 1 | 0 | |
| 1 | 0 | 0 | 0 | 1 | 0 |
| 0 | 1 | 1 | 1 | 0 | |
| 0 | 1 | 0 | 1 | 0 | |
| 1 | 0 | 0 | 0 | 1 | 0 |
| 0 | 1 | 1 | 1 | 0 | |
| 0 | 1 | 0 | 1 | 0 | 0 |
| 1 | 0 | 0 | 0 | 1 | 0 |
| 1 | 0 | 0 | 0 | 1 | 0 |
| 0 | 1 | 1 | 1 | 0 | |
| 1 | 0 | 1 | 2 | 1 | π |
| 0 | 1 | 0 | 1 | 0 | |
| 1 | 0 | 0 | 0 | 1 | 0 |
| 0 | 1 | 1 | 1 | 0 | |
| 1 | 0 | 1 | 2 | 1 | π |
| 1 | 0 | 1 | 2 | 1 | π |
| 0 | 1 | 0 | 1 | 0 | |
| 0 | 1 | 1 | 1 | 0 | |
| 0 | 1 | 0 | 1 | 0 | |

The evolution corresponding to FIG. 10 and FIG. 14 is shown in table 2. See previous page and caption of table 1 for discussion. Notice here the inversion before Diff is not needed. Also the phase on "ones" are alternating independently of separating zeros. As a result no long string of ones with identical phase exists.

TABLE 2

Data plus data delayed

| Data | Inv(Data) | Diff(inv(Data)) | 3-level | Optical | Phase |
|---|---|---|---|---|---|
| 1 | 0 | 1 | na | na | na |
| 1 | 0 | 1 | 1 | 0 | |
| 1 | 0 | 1 | 1 | 0 | |
| 0 | 1 | 0 | 0 | 1 | 0 |
| 1 | 0 | 0 | 1 | 0 | |
| 0 | 1 | 1 | 2 | 1 | π |
| 0 | 1 | 0 | 0 | 1 | 0 |
| 1 | 0 | 0 | 1 | 0 | |
| 0 | 1 | 1 | 2 | 1 | π |
| 0 | 1 | 0 | 0 | 1 | 0 |
| 1 | 0 | 0 | 1 | 0 | |
| 1 | 0 | 0 | 1 | 0 | |
| 0 | 1 | 1 | 2 | 1 | π |

TABLE 2-continued

Data plus data delayed

| Data | Inv(Data) | Diff(inv(Data)) | 3-level | Optical | Phase |
|---|---|---|---|---|---|
| 1 | 0 | 1 | 1 | 0 | |
| 0 | 1 | 0 | 0 | 1 | 0 |
| 1 | 0 | 0 | 1 | 0 | |
| 0 | 1 | 1 | 2 | 1 | π |
| 1 | 0 | 1 | 1 | 0 | |
| 1 | 0 | 1 | 1 | 0 | |
| 0 | 1 | 0 | 0 | 1 | 0 |
| 0 | 1 | 1 | 2 | 1 | π |
| 0 | 1 | 0 | 0 | 1 | 0 |

Application of Duo-Binary Coding for High-Power Transmission Systems

A conventional binary encoded signal contains half its power in a carrier and the remaining half in a spectrum with a width scaling proportional to the data rate. Compared to a non-modulated signal (narrow-band relative to the bandwidth of SBS), the threshold for stimulated Brillouin scattering increases by 3 dB, when the modulation rate is significantly higher than the SBS bandwidth, so that the maximum power within the SBS bandwidth is 50%—i.e. the power of the carrier. As the SBS threshold of a narrow-band CW signal is typically 6–7 dBm, the threshold with high-speed binary modulation is typically 9–10 dBm. It is desirable to have a high SBS threshold in order to increase the available power budget and therefore the maximum transmission distance of a power limited system. Conventional means of increasing the SBS threshold includes small-signal direct modulation of the transmitter laser, temperature wavelength dithering of the laser, and external phase modulation to artificially increase the time-averaged spectral width.

The spectrum of a duo-binary encoded signal has no carrier (or, for some implementations and certain bit sequences: a very small carrier) and the width is proportional to the data rate. For a given power the integral over the entire spectral distribution remains constant, and the maximum power spectral density therefore decreases with increasing DATA rate. As the stimulated Brillouin scattering is dependent on the power in a bandwidth corresponding to the SBS bandwidth, the SBS threshold increases with decreasing power spectral density—i.e. it increases with the bit rate of a duo-binary encoded signal.

An application of the present invention consists of applying duo-binary encoding to high-speed systems which employ very high launch powers per channel and thus avoid other means of increasing the SBS threshold by artificial broadening of the spectrum.

Illustrative Application

An Experimental Verification of the Performance of Duo-Binary Encoding

Experiments were conducted to demonstrate the theory that the SBS threshold for a duo-binary encoded signal increases with increasing data rate.

Figure 16:
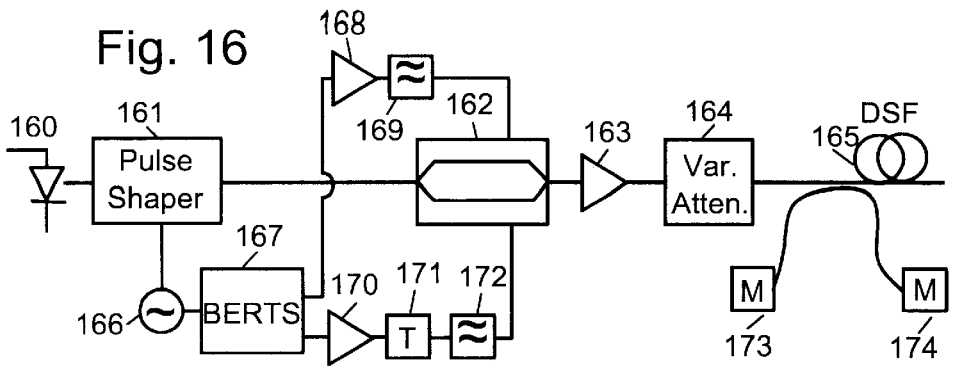
FIG. 16 shows a block diagram of a circuit set up to test the invention.

FIG. 16 shows a schematic drawing of the experimental set-up:

The output of a laser diode (160) was fed into a pulse shaper (161), which was driven by an RF source (166). The output of the pulse shaper (161) was the input to a two-input Mach-Zehnder modulator (162). The output of the modulator (162) was amplified (163), attenuated in a variable attenuator (164), fed into a fiber directional coupler with power meters (173) and (174) for forward and reflected power, and then into 135.4 kilometers of dispersion shifted optical fiber (DSF)(165).

The two inputs to the Mach-Zehnder modulator were the complementary outputs of a bit-error rate test set (BERTS) (167), corresponding to the DATA and DATA-bar signals according to the embodiment of FIG. 12. The BERTS (167) was driven by the RF generator (166). The DATA signal was amplified (168), filtered (169) and fed into one input of the M-Z modulator (162). The DATA-bar signal was amplified (170), delayed by one bit (171), filtered (172) and fed into the second input of the M-Z modulator (162).

Figure 17:
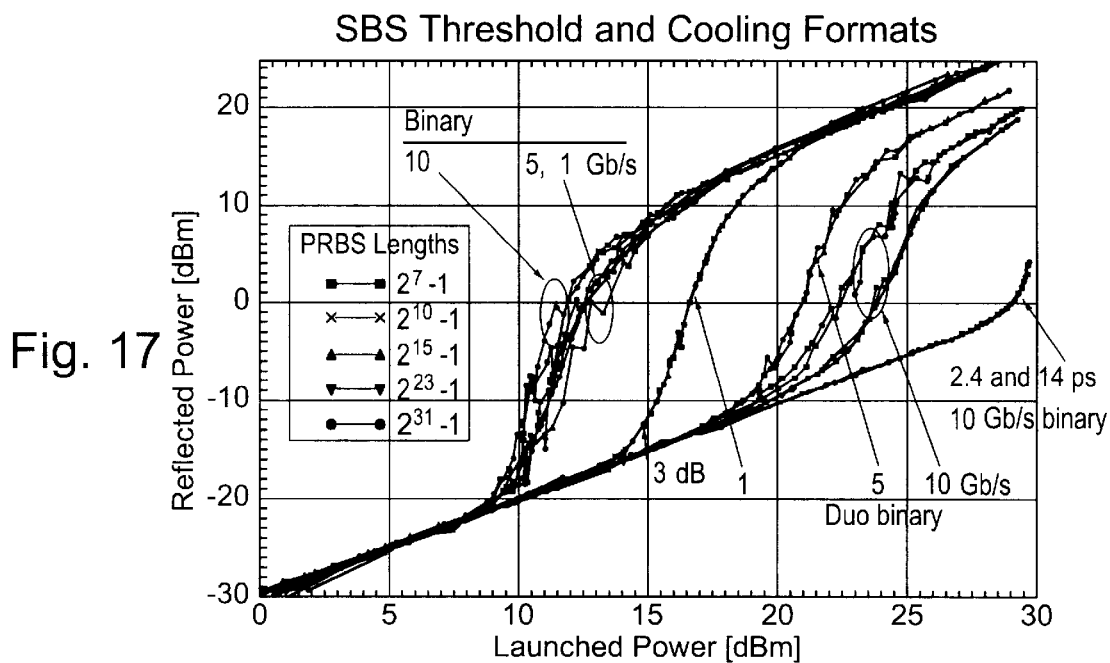
FIG. 17 shows a graph of reflected power versus launched power for NRZ and RZ, binary and duo-binary encoding, at various data rates for the test of the circuit of FIG. 16.

FIG. 17 shows the measured reflected power as a function of the launched power for various bit rates ranging from 1 to 10 Gbps and various pseudo-random bit sequences (PRBS). Results are shown for NRZ binary (labeled: binary), NRZ duo-binary (labeled: duo binary) and for RZ width pulse widths of 2.4 ps and 14 ps (labeled: 2.4 and 14 ps 10 Gbps binary) For NRZ operations the pulse shaper (161) in FIG. 16 was omitted.

The SBS threshold is taken as the launch power at which the reflected power has increased to a value 3 dB higher than the Rayleigh back scatter. The Rayleigh back scatter is the best linear fit to measured points at launch power well below the SBS threshold where a linear correlation between reflected and launched power is observed. The Rayleigh back scatter is apporximately −30 dB.

Figure 18:
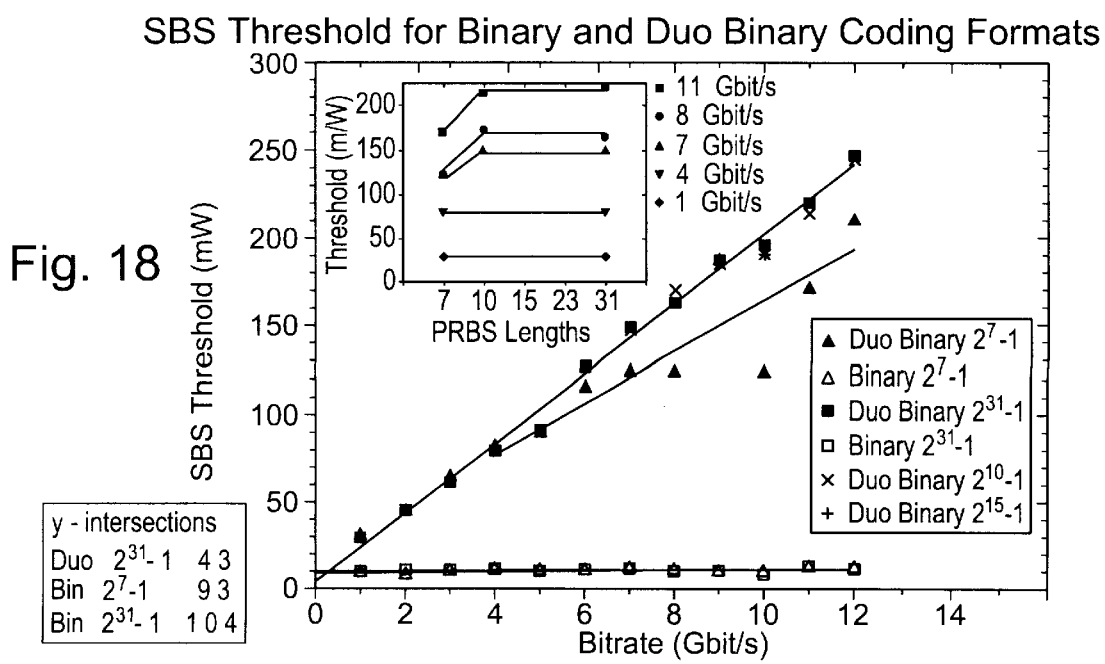
FIG. 18 shows a graph of measured SBS thresholds as a function of bit rate. The insert shows threshold at selected data rates versus PRBS length, N where the wave length is $2^N-1$, for the test of the circuit of FIG. 16.

FIG. 18 shows the measured SBS thresholds versus data rate. Notice that the threshold for binary modulation is ⁻10 mW independent of the bit rate. Results for duo-binary however show an increase in threshold with increasing bit rate. For all other word lengths than the shortest of $2^7-1$ the increase appears to be proportional to the bitrate. In the case of the short bit pattern, $2^7-1$ the frequency components in the data signal have separations large enough to be comparable to the SBS. We believe this is the reason for the data not following a linear dependence of the bit rate. For word length of $2^{10}-1$ and longer an SBS threshold of 23.8 dBm was observed for a data rate of 12 Gbps.

Experiments were also done to demonstrate that duo-binary encoding is a practical modulation format for a transmission system—i.e. that it exhibits little or no penalty in received sensitivity relative to conventional binary encoding. To conduct the experiment the output from the modulator (162) (see FIG. 16) was connected to a conventional 10 Gbps receiver which includes an optical pre-amplifier and clock recovery.

FIG. 19 shows good error rate performance of duo-binary encoding with penalties of only 0.77 dB and 0.45 dB relative to the measured curves for binary modulation. The variation in sensitivity between the three cases may originate from non-ideal and non-identical driver amplifiers.

FIGS. 20 to 23 shows almost identical eye-patterns for binary and duo-binary encoding-both when measured by a high-speed PIN detector (FIGS. 20 and 21) and from the receiver at an error rate of $10^{-9}$ (FIGS. 22 and 23).

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. An encoder for generating an encoded optical signal bearing information related to a supplied data signal, the encoder comprising:

a Mach-Zehnder interferometer having two separately controllable arms, an optical input, and an optical output, said optical input receiving an optical signal, and said optical output supplying the encoded optical signal, one of said two separately controllable arms responsive to only said supplied data signal, and a delay element responsive to said supplied data signal to introduce a delay of substantially one bit period into said supplied data signal and generate a delayed data signal, only said delayed data signal supplied to an other of said two separately controllable arms, said Mach-Zehnder interferometer producing a minimum level for said encoded optical signal when the signals supplied to the controllable arms are substantially identical.

2. The encoder of claim 1, further comprising an amplifier for amplifying a signal, said amplifier coupled between the data input and one of said two separately controllable arms of the Mach-Zehnder modulator.

3. The encoder of claim 1, further comprising an amplifier for amplifying a signal, said amplifier coupled between the output of the delay element and the other of said two separately controllable arms of the Mach-Zehnder modulator.

4. The encoder of claim 1, in which the difference between voltages present at the two separately controllable arms of the modulator is in the range of $-V_\pi$ and $+V_\pi$.

5. The encoder as defined in claim 1, wherein the delay element further includes a signal inverter so that the delayed data signal is a delayed complimentary representation of the supplied data signal.

6. An encoder for generating an encoded optical signal bearing information related to a supplied data signal, the encoder comprising:

a Mach-Zehnder interferometer having two separately controllable arms, an optical input, and an optical output, said optical input receiving an optical signal, and said optical output supplying the encoded optical signal, one of said two separately controllable arms responsive to only a first supplied data signal, and a delay element responsive to a second supplied data signal to introduce a delay of substantially one bit period into said supplied data signal and generate a delayed data signal, only said delayed data signal supplied to an other of said two separately controllable arms, said first and second supplied data signals being complimentary, said Mach-Zehnder interferometer producing a minimum level for said encoded optical signal when the signals supplied to the controllable arms are substantially identical.

7. The encoder of claim 6, further comprising an amplifier for amplifying a signal, said amplifier coupled between the output of the delay element and the other of said two separately controllable arms of the Mach-Zehnder modulator.

8. The encoder of claim 6, in which the difference between the voltages present at the two separately controllable arms of the modulator is in the range of $-V_\pi$ and $+V_\pi$.

9. The encoder of claim 6, further comprising an amplifier for amplifying a signal, said amplifier coupled between the data input and one of said two separately controllable arms of the Mach-Zehnder modulator.

10. The encoder of claim 9, in which the difference between the voltages present at the first and second modulation inputs of the modulator is in the range of $-V_\pi$ and $+V_\pi$.

* * * * *